UNITED STATES PATENT OFFICE.

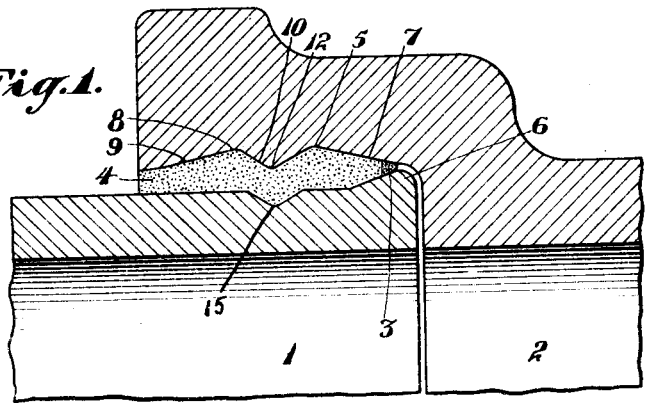
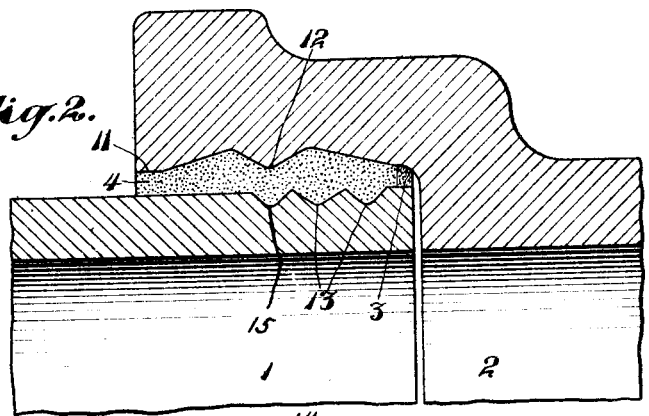
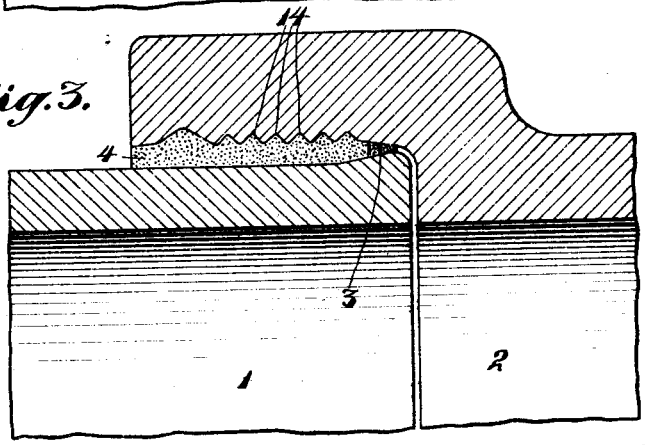

AUGUSTUS J. BOWIE, JR., OF SAN FRANCISCO, CALIFORNIA.

PIPE-JOINT.

1,184,066.

Specification of Letters Patent.   Patented May 23, 1916.

Application filed October 18, 1909.   Serial No. 523,151.

*To all whom it may concern:*

Be it known that I, AUGUSTUS J. BOWIE, Jr., a citizen of the United States, residing at San Francisco, in the county of San Francisco and State of California, have invented new and useful Improvements in Pipe-Joints, of which the following is a specification.

The present invention relates to joints in pipe lines made up preferably with some plastic material, such as lead. It is common practice at present to make pipe joints with grooves of various types in the bell and spigot ends of cast iron joints. These joints are then poured full of some material, to make them tight, lead being usually employed for this purpose. Joints of the types in use do not develop anything like the full strength which may be obtained from the material used in making them up, and consequently the pipe is unduly weak against forces tending to produce endwise rupture. This necessitates methods of laying the pipe more expensive and undesirable than would be necessary with a stronger joint, and, moreover, the factor of safety against accident is materially less than it would be with a stronger joint. Furthermore, with a weak joint, any settlement of the pipe is apt to cause leaks, as well as failure of the joint.

The object of the present invention is to overcome these difficulties, to develop the greatest possible strength in the joint, and to afford great tightness against leaks due to displacement or deflection of the pipe.

In the accompanying drawing, Figure 1 is a longitudinal section of my preferred form of joint; Fig. 2 is a similar view of a second form thereof; Fig. 3 is a similar view of a third form.

Referring to the joint, 1 indicates the spigot end of a pipe, 2 the bell end of an adjoining pipe, 3 the packing, and 4 the lead with which the joint is made up.

The maximum strength of the joint against endwise rupture will be developed when the lead shears out a cylinder concentric with the axis of the pipe. In practice I make the joint of slightly less strength, so that it will just not fail by shearing, but will fail by forcing the lead slowly out with the spigot end. By so doing, the joint can be subjected to very severe displacement without leaking, although it develops practically its maximum strength. This result is obtained by a suitable proportion of the inclinations of the wedge surfaces of the grooves in the bell.

In joints of the types now in use, one groove, and sometimes two, are used in the bell. When these joints fail, they do so by first shearing the lead in the grooves and then readily pushing out the balance of the lead with the plug. Hence, even with two grooves, as now used, the strength of the joint is limited by the shearing of the lead rings at the outsides of the grooves. In my invention, I make the grooves practically continuous in a longitudinal direction throughout the bell, so that, of the surface of the bell in contact with the lead, there is little or none which is parallel to the axis of the pipe. This develops the full shearing strength of the lead when properly laid out.

When the spigot end starts to move out of the bell in an endwise direction, the first effect is a tendency to carry the lead near it along with it. By making a gradual taper in the bell groove 5 near to the bead 6, as shown at 7 in Fig. 1, the wedge action forces the lead adjacent to said taper, down on to the pipe, and does not allow it to flow back over the bead, as would occur if the wedge surface had a more abrupt angle. At the same time the effect of the endwise displacement is to compress the lead at the back of the joint and to make it tight against leaks. The groove 8 next to the outside of the bell is made with a long gradual taper 9 on the outer side, and a steeper taper 10 on the inner side. As has been shown by tests, this construction permits of much better calking and stronger joints than is possible when the groove is reversed, as is commonly done. Sometimes, for constructive reasons, the inside of the bell, just outside the first groove on the outside, may, as shown at 11 in Fig. 1, have a small surface parallel to the axis.

As previously mentioned, the effect of calking is most advantageous when the outer groove in the bell has a gradual taper on the outer side, and a steeper taper on the opposite and inner side of the groove. In the poured type of lead joint, the effect of calking will not reach to the bottom of the joint, and hence the back part of the lead in the joint will not be compressed. When the joint tends to pull apart, the spigot end of the pipe tends to compress the lead in the back of the joint, and to calk it in a manner producing an effect similar to that of the manual calking of the front of the joint. This calking will be most effective when the bell of the pipe has a rear groove with gradual taper on the inner side and a steeper taper on the outer side. Thus, a pipe constructed with reversed grooves, as described, will have a most effective joint;—the outer grooves allowing the most effective manual calking, and the inner grooves providing a highly effective self-calking arrangement, if there is any movement of the joint.

When the spigot grooves have been used in prior forms of pipe joints, they have always been opposite to corresponding bell grooves, and in particular opposite to the groove nearest to the outside. The presence of a spigot groove near the outer edge of the joint is objectionable, since it greatly weakens the pipe. In my joint, a spigot groove 15 faces the peak or ridge 12 between the grooves in the bell end, and hence is not near enough to the end of the pipe to impair the full strength of the pipe, and is near enough to receive the benefit of calking. It is so situated that it has the greatest effect in preventing leakage due to repeated expansions and contractions of the pipe.

If the grooves of the spigot end of the pipe are made with the sides inclined at a steep angle to the axis of the pipe, a small motion of the pipe will result in the shearing of the lead in the said grooves and a consequent leakage. To avoid this result, I make the spigot grooves with sides having a small inclination to the axis of the pipe. With this construction the result of motion of the spigot relative to the bell is to cause a flow of lead under great pressure into the spigot groove, and it will not cause shearing of the lead in the groove. This prevents the leakage which would result from a groove with sides abruptly inclined to the axis of the pipe.

When spigot ends with beads are cut off from a pipe, the end of the remainder of the pipe is often banded with a small iron hoop to form a substitute for a bead. This results usually in poor work, and in these cases it is better to resort to other methods. To overcome the difficulty due to this cause, and to make a more economical and better job, I provide in this case a series of grooves 13 in the spigot end, as shown in Fig. 2 in addition to the outer groove 15 substantially opposite the ridge between the bell grooves.

Fig. 3 shows a modification of the invention with a large outside bell groove, and with the inner groove of the first form replaced by a plurality of smaller grooves 14.

I claim:—

1. In a pipe joint, a bell having internal inner and outer grooves, the outer groove having a gradual taper on the outer side and a steeper taper on the inner side, and the inner groove being similar to the outer groove but reversed in direction, and material closing the space between the bell and spigot members, substantially as described.

2. In a pipe joint, a bell having internal grooves substantially continuous through the space for calking material, the outer groove having a gradual taper on the outer side and a steeper taper on the inner side, and the inner groove being similar to the outer groove but reversed in direction, and material closing the space between the bell and spigot members. substantially as described.

3. In a pipe joint, a bell having internal grooves and substantially no surface between the grooves parallel to the axis of the pipe, the outer groove having a gradual taper on the outer side and a steeper taper on the inner side, and the inner groove being similar to the outer groove but reversed in direction, and material closing the space between the bell and spigot members, substantially as described.

4. A pipe joint, the bell portion of the pipe having inner grooves forming therebetween an annular ridge, and the spigot portion having an annular groove opposite to said ridge, and material closing the space between the bell and spigot members, substantially as described.

5. A pipe joint, the bell portion of the pipe having inner grooves forming therebetween an annular ridge, and the spigot portion having an annular groove opposite to said ridge, and also having a corrugation between said spigot groove and the end of the pipe, and material closing the space between the bell and spigot members, substantially as described.

6. A pipe joint of which the bell member is formed with grooves, and a grooved spigot member its first groove inward from the face of the bell being to the rear of the first groove in the bell member and calking material filling said first groove, substantially as described.

7. A pipe joint having a bell member formed with grooves and a grooved spigot member, a groove in the spigot member being to the rear of the first groove in the bell member, and calking material filling said spigot groove.

8. A pipe joint having a bell member formed with grooves, and a grooved spigot member, the sides of said spigot groove making an inclination of less than one-half a right angle to the axis of the pipe, and calking material filling said spigot groove.

9. A pipe joint having a bell member formed with grooves, and a grooved spigot member, a groove in said spigot member being to the rear of the first groove in the bell member, the sides of said spigot groove making a small inclination to the axis of the pipe, and calking material filling said spigot groove.

In testimony whereof I have hereunto set my hand in the presence of two subscribing witnesses.

AUGUSTUS J. BOWIE, Jr.

Witnesses:
  FRANCIS M. WRIGHT,
  D. B. RICHARDS.